United States Patent [19]

Umehara et al.

[11] Patent Number: 4,942,485

[45] Date of Patent: Jul. 17, 1990

[54] APPARATUS CAPABLE OF DATA REPRODUCTION FROM DIGITAL TAPE CASSETTES OR LIKE STORAGE MEDIA EMPLOYING TWO DIFFERENT RECORDING METHODS

[75] Inventors: Shinji Umehara, Kodaira; Yukinobu Nakamura, Tanashi, both of Japan

[73] Assignee: Teac Corporation, Tokyo, Japan

[21] Appl. No.: 228,030

[22] Filed: Aug. 4, 1988

[30] Foreign Application Priority Data

Aug. 21, 1987 [JP] Japan .............................. 62-207864

[51] Int. Cl.$^5$ .............................................. G11B 5/09
[52] U.S. Cl. .......................................... 360/46; 360/67
[58] Field of Search ....................... 360/46, 67, 27, 41, 360/32, 69

[56] References Cited

U.S. PATENT DOCUMENTS

| | | | |
|---|---|---|---|
| 3,947,876 | 3/1976 | Gray | 360/41 |
| 4,363,040 | 12/1982 | Inose | 360/46 |
| 4,542,419 | 9/1985 | Morio et al. | 360/32 |
| 4,583,134 | 4/1986 | Nakamichi | 360/69 |
| 4,656,533 | 4/1987 | Sakai et al. | 360/46 |
| 4,786,986 | 11/1988 | Yamanushi et al. | 360/27 |

OTHER PUBLICATIONS

Richard C. Schneider, "Write Equalization in High--Linear-Density Magnetic Recording", IBM J. Res. Develop., vol. 29, No. 6, Nov. 1985, pp. 563–568.

Primary Examiner—Vincent P. Canney
Attorney, Agent, or Firm—Woodcock Washburn Kurtz Mackiewicz & Norris

[57] ABSTRACT

A compatible apparatus capable of reproducing digital data from magnetic tape cassettes employing two different recording schemes such as, typically, NRZI and write equalization. A series of common reproduce circuit elements (e.g. an attenuator, automatic grain control, low pass filter, and shaping circuit) are connected to a magnetic transducer via a preamplifier for use in processing the transducer output signal representative of both NRZI and write equalized data recovered from both types of tape cassettes. Serially inserted in the series connection of the common reproduce circuit elements is a parallel connection of a first exclusive reproduce circuit element (e.g. a differentiating amplifier) used exclusively for reproduction of the NRZI data, and a second exclusive reproduce circuit element (e.g. a flat amplifier) used exclusively for reproduction of the write equalized data. As each loaded tape cassette is automatically identified as being of the NRZI or write equalization type, the required one of the first and second exclusive reproduce circuit elements is switched into serial connection with the common reproduce circuit elements. Most of the reproduce circuit elements can thus be used in common for the processing of both NRZI and write equalized data.

4 Claims, 7 Drawing Sheets

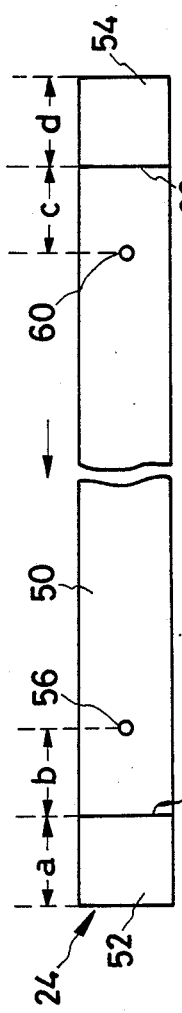
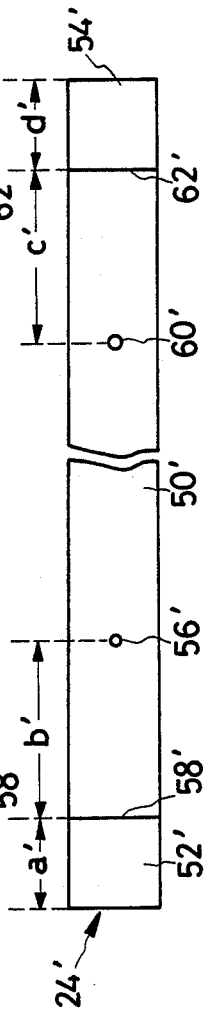
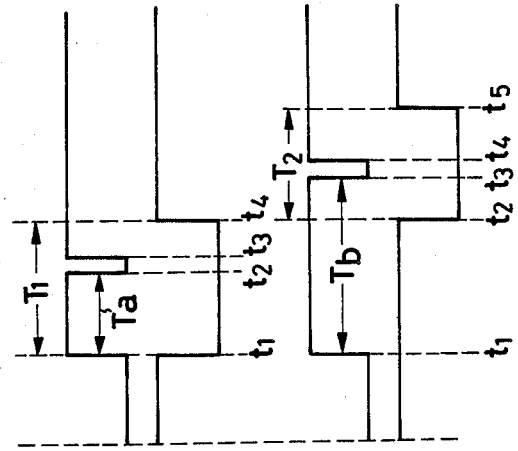
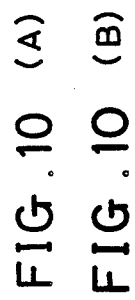
FIG. 2
FIG. 3
FIG. 9 (A)
FIG. 9 (B)
FIG. 10 (A)
FIG. 10 (B)

FIG. 7(A)
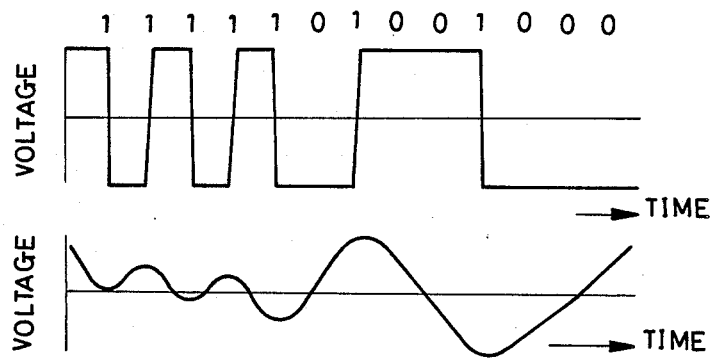
FIG. 7(B)
FIG. 8(A)
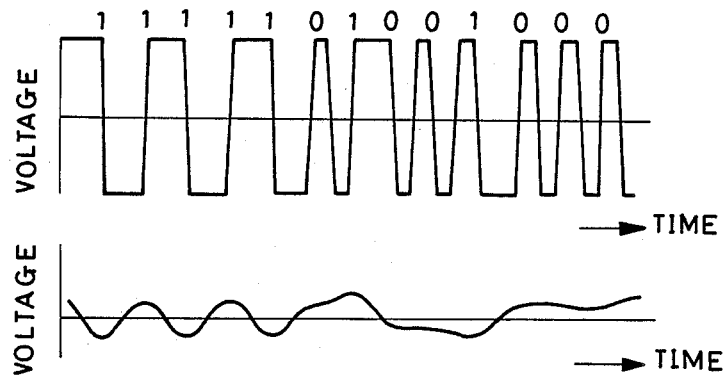
FIG. 8(B)

APPARATUS CAPABLE OF DATA REPRODUCTION FROM DIGITAL TAPE CASSETTES OR LIKE STORAGE MEDIA EMPLOYING TWO DIFFERENT RECORDING METHODS

BACKGROUND OF THE INVENTION

Our invention relates generally to apparatus for data transfer with magnetic storage media such as tape cassettes, and particularly, to an apparatus capable of recovering and processing data from digital tape cassettes or like storage media on which the data have been recorded with two different methods. Typical examples of such different recording methods are NRZI (nonreturn to zero IBM) and write equalization.

Our invention has a close relation with U.S. Pat. application Ser. No. 170,826 filed Mar. 21, 1988, now U.S. Pat. No. 4,843,490 issued Jun. 27, 1989, by Tamotsu Haraguchi under the title of "System for Discriminating between Two Tape Assemblies of Different Recording Characteristics to Be Loaded Interchangeably in Data Transfer Apparatus" and assigned to the assignee of the instant application. The contents of this earlier application will be incorporated herein insofar as is necessary for a full understanding of our invention.

NRZI represents one of the familiar magnetic recording methods of digital signals. Write equalization has more recently been suggested as a refinement of NRZI. Reference may be had to the article entitled, "Write Equalization in High Linear Density Magnetic Recording", by Richard C. Schneider in the Vol. 29, No. 26, issue of *IBM J. RES. DEVELOP.* published in Nov. 1985, for a detailed discussion of write equalization.

Generally, different recording methods demand different circuit configurations for reproduction. For example, NRZI requires a differentiator for reproduction, but write equalization does not. It will nevertheless be desirable or convenient if tape assemblies on which data have been written by different methods can be read by one and the same apparatus.

The above cross reference Haraguchi application teaches an example of such compatible apparatus, with emphasis on the automatic discrimination between tape assemblies of two different recording methods. It also discloses two separate, self contained reproduce circuits for processing the head output signals representative of the data recovered from the two types of tape assemblies, respectively, together with a switch for selectively connecting either of the reproduce circuits to the magnetic head depending upon which of the two types of tape assemblies has been loaded in the apparatus. We object to the provision of the two self contained reproduce circuits because they add to the cost of the compatible apparatus. Some elements of the reproduce circuits could be used in common for processing the head output signals representative of both kinds of data.

SUMMARY OF THE INVENTION

We have hereby invented how to design an apparatus for reading data that have been recorded on interchangeable tape cassettes or like storage media by two different methods, so as to avoid unnecessary duplication of circuit elements required for processing the signals representative of the recovered data.

Briefly, our invention may be summarized as an apparatus for data transfer with a first storage medium on which data is written by a first method that requires differentation for data reproduction, and with a second storage medium on which data is written by a second method that requires no differentation for data reproduction. The apparatus includes a transducer for data transfer with the loaded first or second storage medium, the transducer producing an electrical data signal representative of the data recovered from the first or second storage medium. Connected to the output of the transducer via an amplifier, usually a preamplifier, are a first signal processing circuit for processing the amplified data signal with a differentiating characteristic, and a second signal processing circuit for processing the amplified data signal without a differentiating characteristic. Discriminating means are provided for identifying the loaded storage medium as the first or the second. Actuated by the discriminating means is a selector circuit which selects an output from the first signal processing circuit when the loaded storage medium is identified as the first, and an output from the second signal processing circuit when the loaded storage medium is identified as the second, for delivery to a common transmission path.

In a preferred embodiment, in which our invention is adapted for a digital tape cassette apparatus, the first method is NRZI, and the second method is write equalization. The first and second signal processing circuit may then be a differentiating amplifier circuit and a flat amplifier circuit, respectively. For processing the transducer output signal representative of both NRZI and write equalized data recovered from the first and second tape cassettes, a series of common reproduce circuit elements are constantly connected to the magnetic transducer via the preamplifier. The common reproduce circuit elements are, for example, an attenuator, an automatic gain control, a low pass filter and a shaping circuit.

Upon loading of each tape cassette in the apparatus, the discriminating means automatically identifies the tape cassette as the NRZI or write equalization type. When the loaded tape cassette is identified as the NRZI type, the differentiating amplifier circuit is switched into serial connection with the common reproduce circuit elements, as the transducer output signal representative of the recovered NRZI data need differentiation for reproduction. When the loaded tape cassette is identified as the write equalization type, on the other hand, the flat amplifier circuit is switched into serial connection with the common reproduce circuit elements.

Thus, in the representative embodiment, it is only the differentiating amplifier circuit and flat amplifier circuit that must be provided separately for processing the NRZI and write equalized data signals. The other components of the reproduce circuit are shared for processing both types of data signals. The circuit configuration of the apparatus can therefore be materially simplified in comparison with the prior art apparatus having two self contained reproduce circuits.

The above and other features and advantages of our invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIG. 2 is an enlarged, fragmentary plan view of the magnetic tape of a first type of tape cassette for use with the apparatus of FIG. 1;

FIG. 3 is a similar view of the magnetic tape of a second type of tape cassette for use with the apparatus of FIG. 1;

FIG. 7, consisting of (A) and (B), is a waveform diagram explanatory of how NRZI data recorded on the first type of tape cassette is read;

FIG. 8, consisting of (A) and (B), is a waveform diagram explantory of how write equalized data recorded on the second type of tape cassette is read;

FIG. 9, consisting of (A) and (B), is a waveform diagram explanatory of how the first type of tape cassette is identified as such by the discriminating means included in the tape cassette apparatus of FIG. 1;

FIG. 10, consisting of (A) and (B), is a waveform diagram explanatory of how the second type of tape cassette is identified as such by the discriminating means;

DESCRIPTION OF THE PREFERRED EMBODIMENTS

Figure 1:
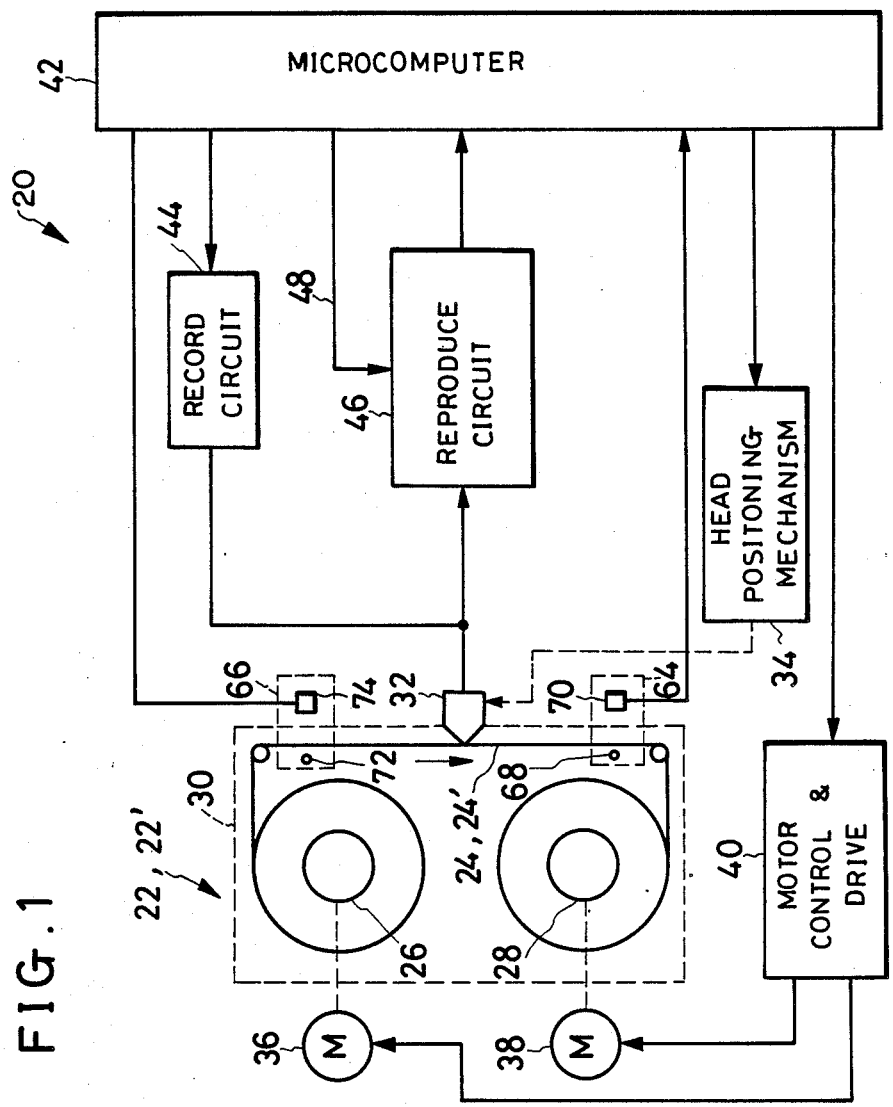
FIG. 1 is a block diagram of the compatible digital magnetic tape cassette apparatus embodying the novel concepts of our invention, shown together with a tape cassette loaded therein.

We will now describe our invention in detail as embodied in a digital tape cassette apparatus shown in FIG. 1 and therein generally designated 20. The apparatus 20 is intended for data transfer (recording and reproduction) with two digital multitrack tape cassettes 22 and 22' on which data has been, and is to be, recorded by different methods. We assume that the two different recording schemes are NRZI and write equalization in this particular embodiment. Since the two tape cassettes 22 and 22' are of standard construction and of identical appearance, we have shown only one tape cassette loaded in the apparatus 20 and designated it 22, 22' for convenience. Actually, the loaded tape cassette may be either of the first type 22, with NRZI data written thereon, of the second type 22' with write equalized data recorded thereon.

The tape cassette 22 or 22' includes a length of multitrack magnetic tape 24 or 24' with a width of, typically, 3,785 millimeters (mm). The tape 24 or 24' has its opposite ends anchored to, and is wound at least in part on, a pair of hubs 26 and 28 which are rotatably mounted within a generally flat, boxlike tape housing 30. We will later describe the magnetic tapes 24 and 24' of the tape cassettes 22 and 22' in more detail with reference to FIGS. 2 and 3 as they differ in the arrangement of some optically detectable marks thereon in order to enable automatic discrimination therebetween.

Let us assume that the hub 26 is a payoff hub, and the other hub 28 a takeup hub, with respect to the predetermined forward direction of tape travel indicated by the arrow in FIG. 1. The magnetic tape 24 or 24' will travel along a predefined path past a transducer or magnetic head assembly 32 forming a part of the data transfer apparatus 20. The head assembly 32 is of the known composite type, being equipped for writing, reading and erasing data on the magnetic tape 24 or 24'during its forward and reverse travels in this particular embodiment. A head positioning mechanism 34, another standard component of the data transfer apparatus 20, is coulped to the head assembly 32 for incrementally transporting the same across the data storage tracks, not shown, on the magnetic tape 24 or 24'.

The data transfer apparatus 20 further comprises a pair of tape transport motors 36 and 38 which will drivingly engage the hubs 26 and 28, respectively, of the tape cassettes 22 or 22' as the latter is loaded in position on the apparatus 20. A motor control and drive circuit 40 is electrically connected to both tape transport motors 36 and 38 for individually driving them as dictated by a factory preprogrammed microcomputer 42 built into the apparatus 20. This microcomputer comprises a central processor unit (CPU) and a memory.

Electrically connected to the head assembly 32 are a record circuit 44 and a reproduce circuit 46. The record circuit 44 is for use in recording both NRZI data and write equalized data on the magnetic tape 24 or 24' under the direction of the microcomputer 42. The record circuit 44, however, falls outside the scope of our invention and therefore constitutes no essential feature of the tape cassette apparatus 20 as far as our invention is concerned.

The reproduce circuit 46 inputs the data signal produced by the head assembly 32 on reading the magnetic tape 24 or 24' of the loaded tape cassette 22 or 22', and processes the data signal into form suitable for delivery to the microcomputer 42. Since the tape cassette 22 or 22' being read may have data written thereon by either the NRZI or write equalization method, the reproduce circuit 46 is equipped to selectively process the NRZI and write equalized data signals put out by the head assembly 32 on reading the two types of tape cassettes in accordance with our invention, as will be detailed subsequently with reference to FIG. 4. The microcomputer 42 has an output connected to the reproduce circuit 46 by way of a line 48 in order to enable the reproduce circuit to selectively process the incoming NRZI or write equalized data signal in a way required by each recording method.

Refer to FIGS. 2 and 3 for a more detailed description of the magnetic tapes 24 and 24' of the tape cassettes 22 and 22'. These tapes 24 and 24' are contrived to enable discrimination between the NRZI and write equalization schemes, although such contrivances are per se conventional and have generally been intended for purposes other than the discrimination between the two types of tape cassettes 22 and 22'.

With reference first to FIG. 2 the tape 24 of the first tape cassette 22 has an elongate, opaque magnetic data storage section 50, together with a transparent leader tape section 52 extending a relatively short distance a from the starting end, shown directed to the left, of the data storage section 50, and another transparent leader tape section 54 extending a similarly short distance d from the finish end of the data storage section. A beginning of tape (BOT) hole 56 or like optically detectable mark is formed in the data storage section 50 at a distance b from its starting position 58. An end of tape (EOT) hole 60 or like optically detectable mark is also formed in the data storage section 50 at a distance c from its ending position 62.

The starting position 58 of the data storage section 50 or, actually, of the magnetic tape 24 is the boundary between data storage section 50 and leader tape section 52. Likewise, the ending position 62 of the data storage section 50 or of the magnetic tape 24 is the boundary between data storage section 50 and leader tape section 54. Since the data storage section 50 is opaque, and the leader tape sections 52 and 54 transparent, the starting 58 and ending 62 positions of the tape are both detectable optically.

We have mentioned that the tape cassettes 22 and 22' can be of conventional design, with the tapes 24 and 24' having a width of 3.785 mm. Typically, for this standard width magnetic tape 24, the lengths a and d of the leader tape sections 52 and 54 are each 500 mm plus or minus 50 mm. The distances b and c of the BOT hole 56 and EOT hole 60 from the optically detectable boundaries 58 and 62 are each 1219 mm plus or minus 76 mm.

As illustrated in FIG. 3, the magnetic tape 24' of the second tape cassette 22' is of substantially the same make as the above described tape 24 of the first tape cassette 22 except for the placement of the BOT and EOT holes thereon. We have therefore indicated by the various parts of the tape 24' merely by priming the reference numerals used to denote the corresponding parts of the tape 24. The lengths a' and d' of the leader tape portions 52' and 54' of the tape 24' are the same as those of the leader tape portions 52 and 54 of the tape 24. However, the distances b' and c' of the BOT 56' and EOT 60' holes from the optically detectable boundaries 58' and 62' are longer than the distances b and c, being each 2794 mm plus or minus 76 mm.

With reference back to FIG. 1 the data transfer apparatus 20 further comprises a BOT sensor 64 and an EOT sensor 66. The BOT sensor 64 comprises a light source 68 and a photodetector 70 disposed opposite each other across the path of the magnetic tape 24 or 24' of the loaded first 22 and second 22' tape cassette on the downstream side of the head assembly 32 with respect to the forward traveling direction of the tape. The EOT sensor 66 likewise comprises a light source 72 and a photodetector 74 disposed opposite each other across the path of the magnetic tape 24 or 24' on the upstream side of the head assembly 32. The photodetectors 70 and 74 are both electrically coupled to the microcomputer 42.

The BOT 64 and EOT 66 sensors are both standard components of this type of data transfer apparatus, having been used for optically detecting the BOT holes 56 and 56' and EOT holes 60 and 60' in the tapes 24 and 24' for controlling the reading or writing of data thereon. We utilize these sensors for the additional purpose of discriminating between the two different types of tape cassettes 22 and 22', which are to be loaded selectively in the apparatus 20, in a manner that will become apparent as the description proceeds.

Figure 4:
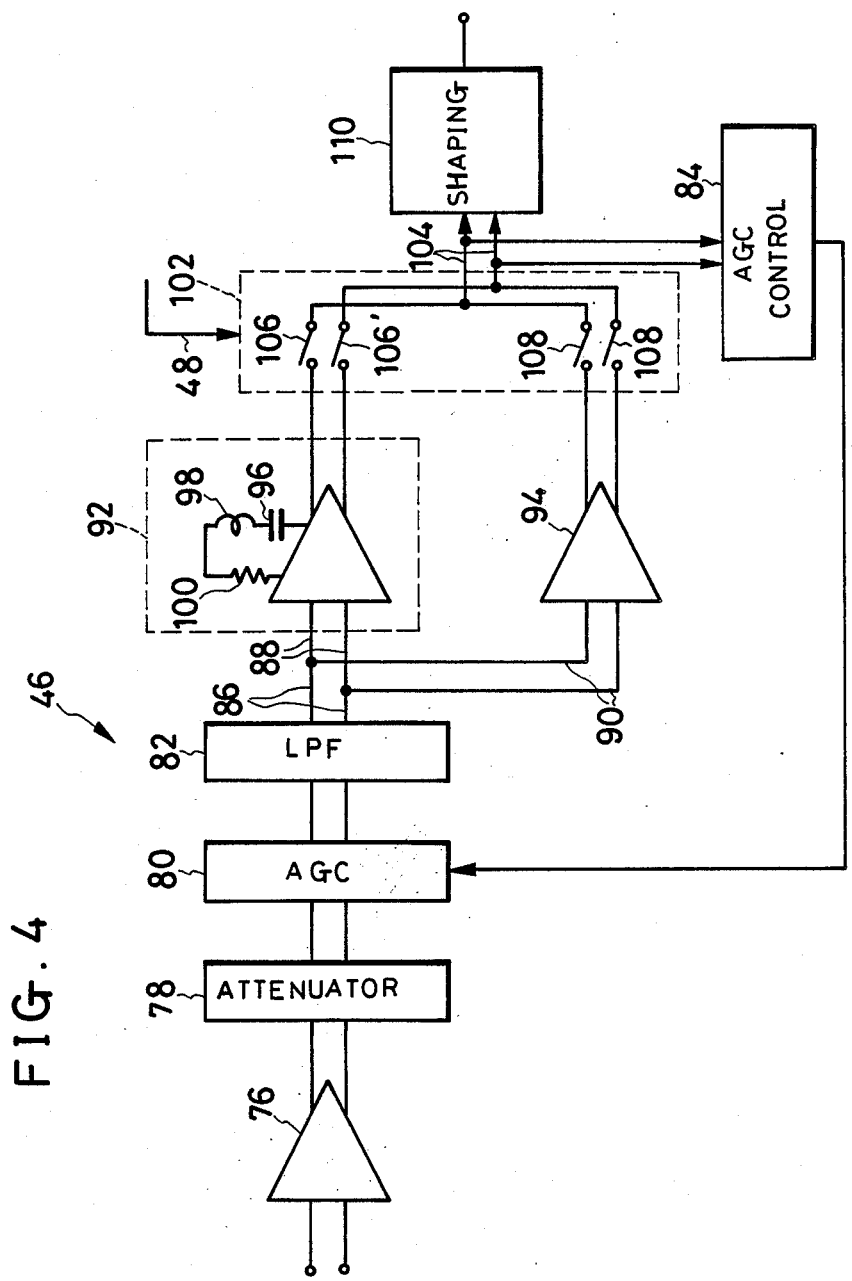
FIG. 4 is a block diagram showing the reproduce circuit in the apparatus of FIG. 1 in more detail, the reproduce circuit including a series of common circuit elements for processing the signals representative of the data read from both first and second types of tape cassettes, and a parallel connection of two exclusive circuit elements to be selectively switched into serial connection with the common circuit elements depending upon which of the two types of tape cassettes has been loaded in the apparatus.

FIG. 4 is a more detailed illustration of the reproduce circuit 46 of the data transfer apparatus 20, which circuit is capable of processing both NRZI data and write equalized data read from the tape cassettes 22 and 22'. Included are a preamplifier 76, an attenuator 78, an automatic gain control (AGC) 80, and a low pass filter (LPF) 82, which are all serially connected to the head assembly 32 in that order. The attenuator 78 serves the purpose of reducing the amplitude of the preamplified data signal without introduction of any appreciable distortion. The AGC 80 functions to provide a data signal of substantially constant magnitude in the face of the different sensitivities of the magnetic tapes 24 and 24'. The AGC 80 has a control input coupled to an AGC control circuit 84 to be referred to subsequently. The LPF 82 is intended for the elimination of high frequency noise that may be contained in the output from the AGC 80.

The above enumerated components 76, 78, 80 and 82 of the reproduce circuit 46 are all used in common for the processing of both NRZI and write equalized data signals produced by the head assembly 32 on reading the tapes 24 and 24' of the tape cassettes 22 and 22'. However, some addition components of the reproduce circuit 46, which are connected on the output side of the LPF 82 in this embodiment, are used exclusively for processing the NRZI or write equalized data. Thus the pair of output lines 86 of the LPF 82 are divided into a first pair of branch lines 88 and a second pair of branch lines 90.

The first branch line pair 88 is connected to a differentiating amplifier circuit 92 for processing the NRZI data signal, and the second branch line pair 90 to a flat amplifier circuit 94 having a flat frequency characteristic for processing the write equalized data signal. The differentiating amplifier circuit 92 comprises a serial circuit of a capacitor 96, inductor 98 and resistor 100 for providing a differential characteristic needed for processing the NRZI data signal. The flat amplifier circuit 94 has approximately the same gain as the differentiating amplifier circuit 92. Both amplifier circuits 92 and 94 are each constructed to provide positive and negative outputs with a phase difference of 180 degrees in this particular embodiment.

Connected to the outputs of the differentiating amplifier circuit 92 and the flat amplifier circuit 94 are a selector circuit 102 for permitting the selective passage therethrough of the outputs from the amplifier circuits 92 and 94 on to a common pair of output lines 104. The selector circuit 102 has a first pair of switches 106 and 106' coupled to the differentiating amplifier circuit 92, and a second pair of switches 108 and 108' coupled to the flat amplifier circuit 94. The switches 106 and 108 are both coupled to one of the common output lines 104, and the switches 106' and 108' to the other of the common output lines 104.

The noted output line 48 of the microcomputer 42 is connected to this selector circuit 102. The microcomputer 42 closes the first pair of selector switches 106 and 106' upon identifying the loaded tape cassette as being of the first type 22, and the second pair of selector switches 108 and 108' upon identifying the loaded tape cassette as being of the second type 22', in response to the outputs from the BOT and EOT sensors 64 and 66.

The pair of ouput lines 104 of the selector circuit 102 to a shaping circuit 110 besides being connected to the mentioned AGC control circuit 84. The shaping circuit 110 modifies the shapes of the output signals of the differentiating amplifier circuit 92 and flat amplifier circuit 94 into the required form of read data pulses suitable for subsequent processing by the microcomputer 42.

Figure 5:
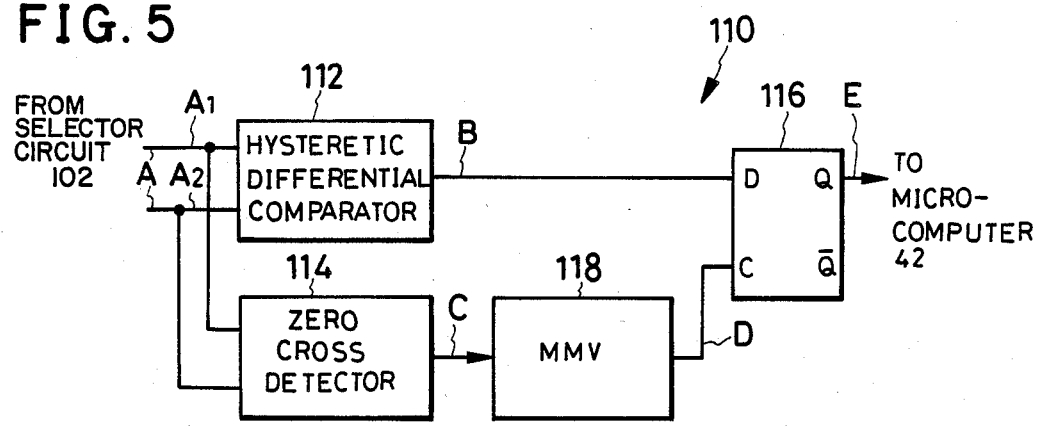
FIG. 5 is a block diagram showing in greater detail the shaping circuit included in the reproduce circuit of FIG. 4.

FIG. 5 block diagrammtically illustrates the details of the shaping circuit 110. The following description of this shaping circuit will be better understood by referring also to FIG. 6 which shows the waveforms (A) through (E) appearing in the various parts of the shaping circuit. In FIG. 5 we have indicated by the same capitals A through E the parts where the corresponding waveforms of FIG. 6 appear.

The shaping circuit 110 comprises a hysteretic differential comparator 112 and a zero cross detector circuit 114, both of which are to be selectively coupled to the differentiating amplifier circuit 92 or to the flat amplifier circuit 94 via the selector circuit 102. The differential comparator 112 hysteretically compares its positive input A1 and negative input A2, both shown at (A) in FIG. 6, and produces a series of rectangular output pulses shown in FIG. 6(B). The zero cross detector circuit 114 also has a comparator for producing a series of negative pulses given at FIG. 6(C), in response to the crossing of the two inputs A1 and A2 at the zero level.

The hysteretic differential comparator 112 is connected to the data input D of a D flip flop 116, whereas the zero cross detector circuit 114 is connected to the clock input C of the flip flop 116 via a monostable multivibrator (MMV) 118. The flip flop 116 has its Q output coupled to the microcomputer 42.

Figure 6A:
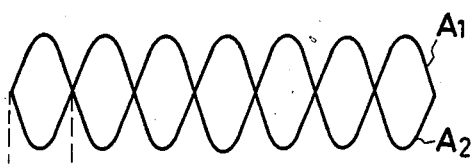
FIG. 6, consisting of (A) through (E), is a waveform diagram explanatory of how the shaping circuit of FIG. 5 shapes the input signals into a desired form of rectangular pulses suitable for delivery to the microcomputer included in the tape cassette apparatus.
Figure 6B:
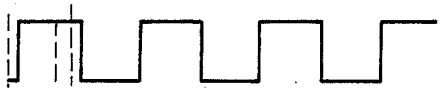
Figure 6C:
Figure 6D:
Figure 6E:
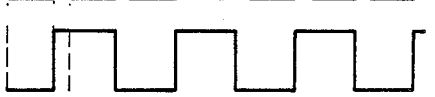

As plotted in FIG. 6(D), the MMV 118 puts out a series of negative pulses in response to the decays of the output pulses, FIG. 6(C), of the zero cross detector circuit 114. Clocked by the rises of the output pulses of the MMV 118, the D flip flop 116 latches the output, FIG. 6(B), from the differential comparator 112 and puts out the shaped read data signal of FIG. 6(E) for delivery to the microcomputer 42.

We have illustrated in FIG. 7(A) an example of NRZI data recorded on the magnetic tape 24 of the first tape cassette 22, and in FIG. 7(B) the corresponding data signal produced by the head assembly 32 on reading the NRZI data. In NRZI, transitions take place at the start of each binary one, and a zero is the absence of a transition, as will be understood from FOG. 7(A). Therefore, in the head output signal of FIG. 7(B) obtained by reading the NRZI data of FIG. 7(A), the peaks represent the binary ones. This data signal is processed by the differentiating amplifier circuit 92, FIG. 4, of the reproduce circuit 46, to provide the waveform that crosses the zero level at the same moments as the peaks of the head output signal. There can thus be obtained the desired series of rectangular pulses of FIG. 6(E) accurately representing the NRZI data which has been recorded on, and read from, the magnetic tape 24 of the first tape cassette 22.

FIG. 8(A), on the other hand, illustrates how the same data as represented in FIG. 7 is recorded by write equalization on the magnetic tape 24' of the second tape cassette 22'. FIG. 8(B) shows the corresponding data signal produced by the head assembly 32 on reading the write equalized data of FIG. 8(A). It will be noted from FIG. 8(A) that each binary zero bit cell of the write equalized data contains both high and low states. However, since binary ones are recorded the same way as with NRZI, write equalization may be considered a modification of NRZI. The corresponding head output signal of FIG. 8(B) is essentially equivalent to the differentiation of the head output signal of FIG. 7(B), for, in FIG. 8(B), the zero crossing points of the waveform correspond to binary ones. This head output signal needs no differentation. Therefore, as will be understood by referring back to FIG. 4, the data signal representative of the recovered write equalized data is directed to the flat amplifier circuit 94 and, after so bypassing the differentiating amplifier circuit 92, to the shaping circuit 110. In this shaping circuit 110 the input signal representative of the write equalized data is processed as above described with reference to FIGS. 5 and 6 to provide the same rectangular pulse signal as that derived from the NRZI data.

OPERATION

Let us suppose tht the first tape cassette 22 has just been laoded in the data transfer apparatus 20, with its magnetic tape 24 not completely wound on the payoff hub 26. As is conventional in the art, the tape 24 will be automatically wound up on the payoff hub 26 as the motor control and drive circuit 40 energizes the first hub motor 36 in response either to the closure of the power switch, not shown, of the data transfer apparatus 20 or to a command from the microcomputer 32. Then, with the first hub motor 36 deenergized, the second hub motor 38 will be set into rotation for driving the takeup hub 28 thereby transporting the tape 24 past the head assembly 32 in the direction of the arrow in FIG. 1.

We have shown in FIG. 9(A) the waveform of the BOT signal fed from the BOT sensor 64 to the microcomputer 42 as the magnetic tape 24 starts traveling forwardly as above stated. Initially, when the photodetector 70 of the BOT sensor 64 is being irradiated by the light source 68 via the transparent leader tape section 52 of the tape 24, the output from the BOT sensor will be low. Then, at a time t1, the BOT sensor output will go high as the opaque data storage section 50 of the tape 24 shields the photodetector 70 from the light source 68. The BOT sensor output will be low during a subsequent brief interval between t2 and t3 as then the BOT hole 56 of the tape 24 travels through the BOT sensor 64.

In response to the incoming BOT signal of FIG. 9(A) the preprogrammed microcomputer 42 will start counting a prescribed period of time T1 as the BOT signal goes high at t1. The time t1 corresponds to the boundary 58, FIG. 2. between the transparent leader tape section 52 and opaque data storage section 50 of the tape 24.

We have indicated the prescribed time period T1 as a low voltage state in FIG. 9(B). It will be seen that the time period T1 lasts from t1 to t4. The starting time t1 of the period T1 is earlier than, and its ending time t4 is later than, the expected 3ime interval t2-t3 during which the BOT sensor output will be low in response to the BOT hole 56 in the tape 24 if the loaded tape cassette is of the first type 22. Thus, if the BOT sensor output goes low during the time period T1, the microcomputer 42 will identify the loaded type cassette as being of the first type 22. If the apparatus 20 is then in the reproduce mode, the microccomputer 42 will proceed to close the first pair of switches 106 and 106', FIG. 4, of the selector circuit 102 included in the reproduce circuit 46. The data signal produced by the head assembly 32 on reading the NRZI data on the magnetic tape 24 will be directed, after having been processed by the common reproduce circuit elements 76, 78, 80 and 82, into the differentiating amplifier circuit 92 preparatory to being shaped in the shaping circuit 110.

The tape cassette loaded in the apparatus 20 may be of the second type 22, having the magnetic tape 24', FIG. 3, bearing write equalized data. Then, as this magnetic tape 24' starts traveling from payoff hub 26 to takeup hub 28, the BOT sensor 64 will produce the output depicted in FIG. 10(A). The BOT sensor output will go high at a time t1 when the boundary 58' between the transparent leader tape section 52' and opaque data storage section 50' of the tape 24' travels past the BOT sensor 64. Then the BOT sensor output will go low at t3 and then high at t4, during which time interval the BOT hole 56' of the tape 24' travels past the BOT sensor 64.

As has been set forth in conjunction with FIGS. 2 and 3, the distance b' of the BOT hole 56' in the tape 24' from the boundary 58' is greater than the distance b of the BOT hole 56 in the tape 24 from the boundary 58. Consequently, the time interval Tb from t1 to t3 in FIG. 10 is longer than the time interval Ta from t1 to t2 in FIG. 9.

Thus the microcomputer 42 may be programmed to start counting a second prescribed period of time T2 at t2 in FIG. 10, which time may be the same as the time t4 in FIG. 9. As indicated in FIG. 10(B), the period T2 begins at t2, which is earlier than the expected time interval t3–t4 during which the BOT hole 56' in the tape 24' is to be detected, and ends at t5, which is later than the time time interval t3–t4. If the output from the BOT sensor 64 remains high during the first prescribed period T1 and goes low during the second presecribed period T2, the microcomputer 42 will identify the loaded tape cassette as the second type 22'. If data reproduction from the identified second tape cassette 22' is then required, the microcomputer 42 will proceed to close the second piar of switches 108 and 108', FIG. 4, of the selector circuit 102. The data signal output of the head assembly 32, representative of the recovered write equalized data, will then be directed through the flat amplifier circuit 94 into the shaping circuit 110 after having been processed by the common reproduced circuit elements 76, 78, 80 and 82.

We understand that the BOT holes 56 and 56' in the tapes 24 and 24', detected by the BOT sensor 64, are utilized not only for discrimination between the two types of tape cassettes 22 and 22' but also for the conventional purpose of tape beginning detection.

Figure 11:
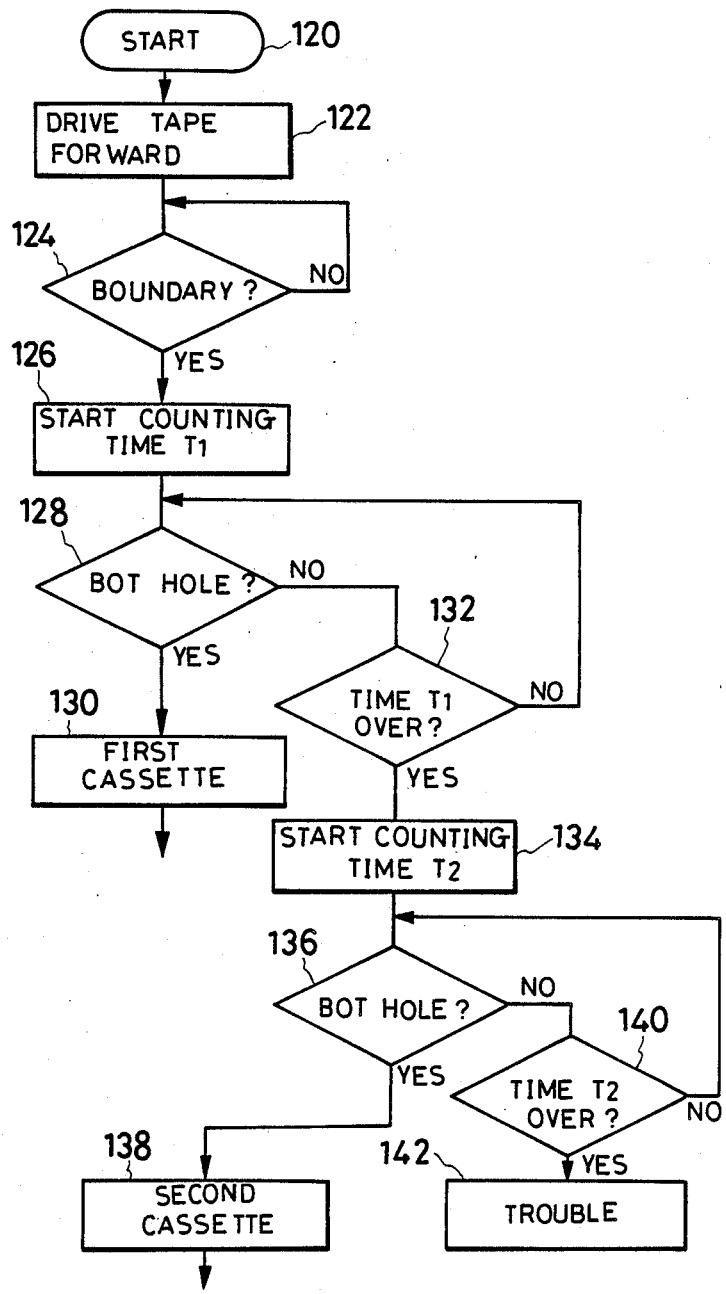
FIG. 11 is a flow chart explanatory of how the microcomputer included in the apparatus of FIG. 1 is programmed to discriminate between the first and second types of tape cassettes.

Shown in FIG. 11 is a flow chart explanatory of the microcomputer program for carrying into practice the above discussed method of discrimination between the two types of tape cassettes 22 and 22'. The process of tape cassette discrimination starts at 120 with the rewinding, if necessary, of the tape 24 or 24' of the loaded tape cassette 22 or 22' on the payoff hub 26. The leader tape section 52 or 52' of the tape 24 or 24' will become partly positioned in the BOT sensor 64 upon completion of tape rewinding.

Then, as indicated at 122 in FIG. 11, the forward travel of the tape 24 or 24' is initiated. Shortly after the commencement of the forward tape travel the BOT sensor 64 will detect the boundary 58 or 58' between the transparent leader tape section 52 or 52' and opaque data storage section 50 or 50' of the tape 24 or 24', as at 124. Then the microcomputer 42 will start counting the first prescribed period of time T1, as at 126, and will wait for the detection of the BOT hole 56 of the first tape cassette 22 by the BOT sensor 64 during that period, as at 128. If the BOT hole 56 is detected during the period T1, the microcomputer 42 will identify the loaded tape cassette as being of the first type 22, as at 130.

The first prescribed period T1 will come to an end with no BOT hole detected, as at 132, if the loaded tape cassette is of the second type 22'. In that case, upon termination of the first prescribed period T1, the microcomputer 42 will start counting the second prescribed period T2 as at 134 and wait for the detection of the BOT hole 56' of the second type tape cassette 22' during that period as at 136. If the BOT hole 56' is detected during the period T2, the microcomputer 42 will identify the loaded tape cassette as being of the second type 22', as at 138.

Possibly, as shown at 140, no BOT hole may be detected during the second prescribed period T2, either, by reason of the malfunctioning of the BOT sensor 64, or of the loading of a tape cassette other than those of the two types 22 and 22' compatible with the data transfer apparatus 20. In that case the microcomputer 42 will generate a trouble signal, as at 142, which may be utilized for warning the user of the occurrence of trouble and for informing him of its possible causes.

A particular advantage gained by our invention, as embodied in the above disclosed data transfer apparatus 20, is best revealed in FIG. 4. We have connected the differential amplifier circuit 92 and flat amplifier circuit 94 of substantially the same gain in parallel with each other on the output side of the LPF 82 for selective reproduction of NRZI and write equalized data from the two different types of tape cassettes 22 and 22'. These two amplifier circuits 92 and 94, plus the selector circuit 102, are the sole means required for separately processing the NRZI and write equalized data signals that have been recovered from the tape cassettes 22 and 22'. All the other components of the reproduce circuit 46, namely, the preamplifier 76, attenuator 78, AGC 80, LPF 82 and shaping circuit 110, are used in common for processing both NRZI and write equalized data signals.

SECOND FORM

Figure 12:
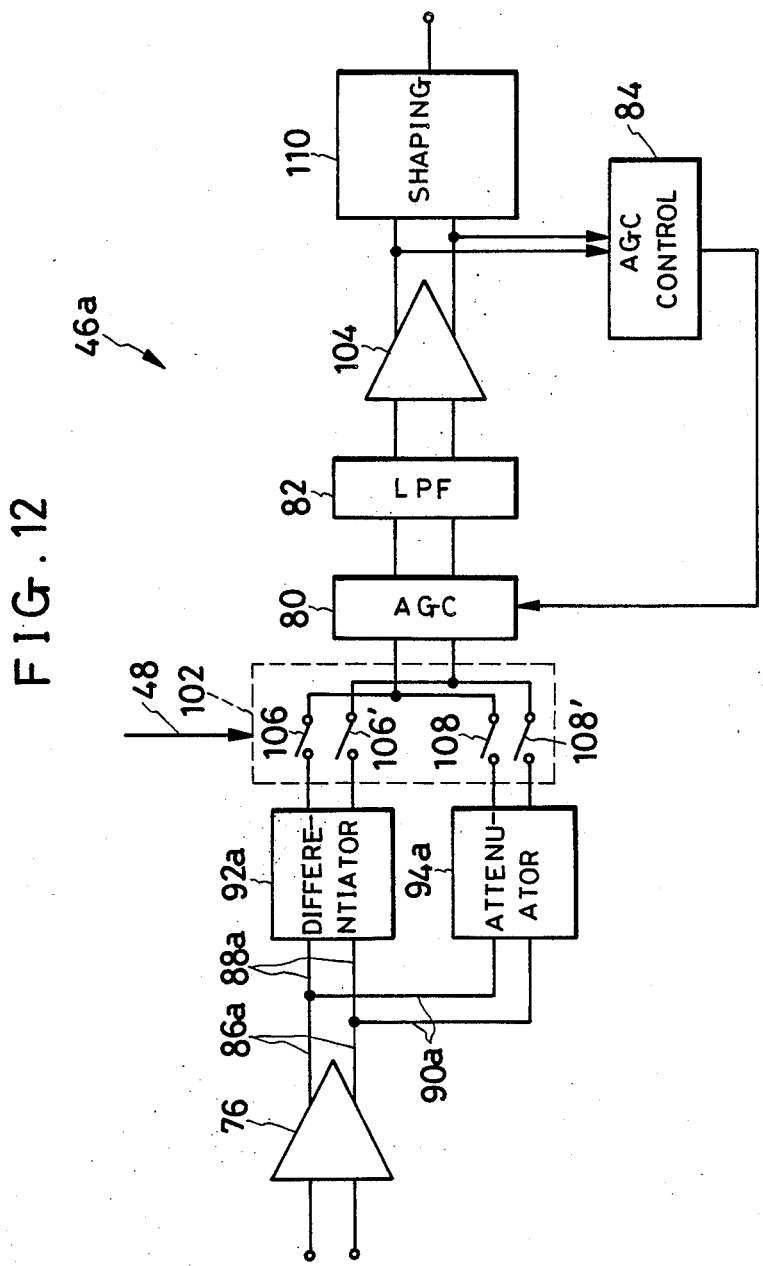
FIG. 12 is a block diagram of an alternative reproduce circuit for use in the tape cassette apparatus in FIG. 1 in substitution for the reproduce circuit shown in detail in FIG. 4.

The reproduce circuit 46 of the data transfer apparatus 20 may be modified as shown as 46a in FIG. 12 within the scope of our invention. In the modified reproduce circuit 46a the preamplifier 76 has its pair of output lines 86a divided into first 88a and second 90a pairs of branch lines. The first pair of branch lines 88a are coupled to a differentiator circuit 92a, and the second pair of branch lines 90a to an attenuator circuit 94a. The attenuator circuit 94a should attenuate the head output signal representative of the write equalized data to the same degree as the differentiator circuit 92a attenuates the head output signal representative of the NRZI data.

The outputs of the differentiator circuit 92a and the attenuator circuit 94a are both connected to the selector circuit 102 having the first pair of switches 106 and 106' and the second pair of switches 108 and 108' to be selectively closed by the signal fed from the microcomputer over the line 48 upon identification of the loaded tape cassette 22 or 22'. The outputs of the selector circuit 102 are coupled to the shaping circuit 110 via the AGC 80, the LPF 82 and an amplifier circuit 114.

We believe that the operation of the modified reproduce circuit 46qi a is self evident from the foregoing description of FIG. 4 in conjunction with FIGS. 7 and 8.

POSSIBLE MODIFICATIONS

Despite the foregoing detailed disclosure we do not wish our invention to be limited by the exact details of the illustrated embodiments. The following is a brief list of possible modifications or alterations which we believe fall within the scope of our invention.

1. The two different types of tape cassettes, or equivalent tape assemblies, may be discriminated by methods other than the detection of the BOT holes formed in different locations on the tapes. One possible alternative method is to make different the frequencies of the known reference burst signals written on the two different tapes in the initial part of track zero thereon. The tapes may be discriminated by detecting the frequencies of the reference burst signals prior to the commencement of data transfer.

2. The reproduce circuit 46 or 46a may be constructed to process only one signal, representative of either NRZI or write equalized data, at a time.

3. The provision of the record circuit 44 is not of absolute necessity, all that is required being that the apparatus be capable of recovering data that have been recorded on tape assemblies or other storage media by two different methods.

What we claim is:

1. An apparatus for data transfer with first and second tape assemblies on which data are recorded by different methods and which are interchangeably loaded in and unloaded from the apparatus, wherein the improvement comprises:
   (a) a transducer for data transfer with the loaded first or second tape assembly, the transducer producing an electrical data signal representative of the data recovered from the first or second tape assembly;
   (b) am amplifier connected to the transducer for amplifying the data signal;
   (c) a serial connection of common circuit elements connected to the amplifier for processing the amplified data signal representative of the data recovered from both the first and the second tape assemblies, the common circuit elements comprising an attenuator, an automatic gain control, a low pass filter and a shaping circuit which are connected in that order to the amplifier;
   (d) a first exclusive circuit element for exclusive use in processing the amplified data signal representative of the data recovered from the first tape assembly;
   (e) a second exclusive circuit element for exclusive use in processing the amplified data signal representative of the data recovered from the second tape assembly, the first and second exclusive circuit elements being connected in parallel with each other between the low pass filter and the shaping circuit;
   (f) discriminating means for the identifying the loaded tape assembly as the first or the second; and
   (g) a selector circuit connected to the discriminating means and actuated thereby for connecting the first exclusive circuit element into serial relation with the common circuit elements when the loaded tape assembly is identified as the first, and for connecting the second circuit element into serial relation with the common circuit elements when the loaded tape assembly is identified as the second, the selector circuit comprising:
      (i) first switch means connected between the first exclusive circuit element and the shaping circuit; and
      (ii) second switch means connected between the second exclusive circuit element and the shaping circuit, the first and second switch means being selectively actuated by the discriminating means.

2. The data transfer apparatus of claim 1 wherein the first exclusive circuit element is a differentiating amplifier circuit, and the second exclusive circuit element is a flat amplifier circuit.

3. An apparatus for data transfer with first and second tape assemblies on which data are recorded by different methods and which are interchangeably loaded in and unloaded from the apparatus, wherein the improvement comprises:
   (a) a transducer for data transfer with the loaded first or second tape assembly, the transducer producing an electrical data signal representative of the data recovered from the first or second tape assembly;
   (b) an amplifier connected to the transducer for amplifying the data signal;
   (c) a serial connection of common circuit elements connected to the amplifier for processing the amplified data signal representative of the data recovered from both the first and the second tape assemblies, the common circuit elements comprising an automatic gain control, a low pass filter, a second amplifier and a shaping circuit which are connected in that order to the first recited amplifier;
   (d) a first exclusive circuit element for exclusive use in processing the amplified data signal representative of the data recovered from the first tape assembly;
   (e) a second exclusive circuit element for exclusive use in processing the amplified data signal representative of the data recovered from the second tape assembly, the first and second exclusive circuit elements being connected in parallel with each other between the first amplifier and the automatic gain control;
   (f) discriminating means for identifying the loaded tape assembly as the first or the second; and
   (g) a selector circuit connected to the discriminating measn and actuated thereby for connecting the first exclusive circuit element into serial relation with the common circuit elements when the loaded tape assembly is identified as the first, and for connecting the second circuit element into serial relation with the common circuit elements when the loaded tape assembly is identified as the second, the selector circuit comprising:
      (i) a first switch means connected between the first exclusive circuit element and the automatic gain control; and
      (ii) a second switch means connected between the second exclusive circuit element and the automatic gain control, the first and second switch means being selectively actuated by the discriminating means.

4. The data transfer apparatus of claim 3 wherein the first exclusive circuit element is a differentiator circuit, and the second exclusive circuit element is an attenuator circuit.

* * * * *

UNITED STATES PATENT AND TRADEMARK OFFICE
CERTIFICATE OF CORRECTION

PATENT NO. : 4,942,485

DATED : July 17, 1990

INVENTOR(S) : Umehara et al

It is certified that error appears in the above-identified patent and that said Letters Patent is hereby corrected as shown below:

Col. 2, line 1, "differentation" should be spelled --differentiation--.

Col. 2, line 3, "differentation" should be spelled --differentiation--.

Col. 4, line 27, "coulped" should be spelled --coupled--.

Col. 4, line 43, "equialized" should be spelled --equalized--.

Col. 7, line 52, "FOG." should be --FIG--.

Col. 8, line 23, change "tht" to --that--.

line 24, change "laoded" to --loaded--.

line 60, change "3ime" to --time--.

line 67, change spelling of "microccomputer" to --microcomputer--

Col. 9, line 36, change spelling of "presecribed" to --prescribed--.

Col. 11, line 2, change "46qi a" to --46a--.

line 40, change the word "am" to --an--.

UNITED STATES PATENT AND TRADEMARK OFFICE
CERTIFICATE OF CORRECTION

PATENT NO. : 4,942,485

DATED : July 17, 1990

INVENTOR(S) : Umehara et al

It is certified that error appears in the above-identified patent and that said Letters Patent is hereby corrected as shown below:

Col. 12, line 48, "measn" should be --means--

Signed and Sealed this

Sixth Day of October, 1992

Attest:

DOUGLAS B. COMER

Attesting Officer

Acting Commissioner of Patents and Trademarks